United States Patent
Toft et al.

(10) Patent No.: US 8,007,882 B2
(45) Date of Patent: Aug. 30, 2011

(54) PACKAGING LAMINATE, METHOD FOR ITS MANUFACTURING AND PACKAGING CONTAINER MANUFACTURED FROM THE PACKAGING LAMINATE

(75) Inventors: Nils Toft, Malmo (SE); Thorbjorn Andersson, Sodra Sandby (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 419 days.

(21) Appl. No.: 10/512,995

(22) PCT Filed: Apr. 29, 2003

(86) PCT No.: PCT/SE03/00690
§ 371 (c)(1),
(2), (4) Date: Oct. 29, 2004

(87) PCT Pub. No.: WO03/095200
PCT Pub. Date: Nov. 20, 2003

(65) Prior Publication Data
US 2005/0181154 A1    Aug. 18, 2005

(30) Foreign Application Priority Data
May 7, 2002  (SE) ...................... 0201396

(51) Int. Cl.
*B32B 1/02* (2006.01)
*B32B 1/08* (2006.01)
(52) U.S. Cl. ............ 428/34.2; 428/34.1; 428/35.7; 428/35.9; 428/36.9
(58) Field of Classification Search ............... 428/34.1, 428/34.2, 35.7, 35.9, 36.9
See application file for complete search history.

(56) References Cited

U.S. PATENT DOCUMENTS

| | | | | |
|---|---|---|---|---|
| 3,393,118 A | * | 7/1968 | Ekstrom | 428/138 |
| 4,381,848 A | | 5/1983 | Kahn | |
| 4,595,116 A | * | 6/1986 | Carlsson | 220/359.3 |
| 4,915,229 A | | 4/1990 | Yamada et al. | |

(Continued)

FOREIGN PATENT DOCUMENTS

| | | |
|---|---|---|
| EP | 0 646 457 | 4/1995 |
| EP | 0 870 600 A2 | 10/1998 |
| EP | 0968816 A2 | 1/2000 |
| EP | 0972634 A2 | 1/2000 |

(Continued)

*Primary Examiner* — Marc A Patterson
(74) *Attorney, Agent, or Firm* — Buchanan Ingersoll & Rooney PC (57) ABSTRACT

A packaging laminate comprising a core layer of paper or carton with a through-going hole, a layer of thermoplastics applied onto one outer side of the core layer, an aluminum foil applied onto the other, inner, side of the core layer and bonded to the core layer by means of an intermediate layer of thermoplastics, the two layers of thermoplastics being sealed to each other within the region of the hole to form a membrane of aluminum foil and thermoplastics, and a first adhesive part-layer applied onto the inner side of the aluminum foil, an intermediate part-layer comprising a material providing barrier properties towards migration of free fatty acids, applied adjacent to the first adhesive part-layer, and an innermost part-layer comprising in the majority a metallocene polyethylene. The packaging laminate has improved sealability properties and provides improved or maintained package integrity and openability to a packaging container manufactured from the laminate, for the purpose of aseptic, long-term storage of for example fruit juice, having an opening arrangement, which at opening removes the membrane of laminated layers of aluminum foil and thermoplastics from the region of the hole in the core layer. Preferably, the material providing barrier properties towards migration of free fatty acids is a cycloolefin copolymer and/or a filler.

21 Claims, 2 Drawing Sheets

U.S. PATENT DOCUMENTS

| | | | |
|---|---|---|---|
| 4,940,612 A | 7/1990 | Gibbons et al. | |
| 5,304,162 A * | 4/1994 | Kuen | 604/391 |
| 5,506,011 A | 4/1996 | Farrell et al. | |
| 5,852,152 A | 12/1998 | Walton et al. | |
| 6,146,726 A | 11/2000 | Yoshii et al. | |
| 6,346,581 B1 * | 2/2002 | Tsunogae et al. | 525/332.1 |
| 6,375,067 B1 * | 4/2002 | Moriyama | 229/125.09 |
| 6,402,019 B1 * | 6/2002 | Casale | 229/123.2 |
| 6,974,612 B1 * | 12/2005 | Frisk et al. | 428/34.2 |
| 2005/0175800 A1 | 8/2005 | Staffetti et al. | |

FOREIGN PATENT DOCUMENTS

| | | | |
|---|---|---|---|
| EP | 1 164 085 A1 | | 12/2001 |
| JP | 8134800 | * | 5/1996 |
| JP | 2000-326972 A | | 11/2000 |
| WO | 9601184 A1 | | 1/1996 |
| WO | 98/26994 | * | 6/1998 |
| WO | WO 99/20531 A1 | | 4/1999 |
| WO | 0185565 A1 | | 11/2001 |
| WO | 0224544 A1 | | 3/2002 |
| WO | 0238379 A1 | | 5/2002 |

* cited by examiner

PACKAGING LAMINATE, METHOD FOR ITS MANUFACTURING AND PACKAGING CONTAINER MANUFACTURED FROM THE PACKAGING LAMINATE

TECHNICAL FIELD

The present invention relates to a packaging laminate comprising a core layer of paper or carton with through-going holes, openings or slits, a layer of thermoplastics applied onto one outer side of the core layer, an aluminum foil applied onto the others inner, side of the core layer, extending throughout the laminate, and bonded to the core layer by means of an intermediate layer of thermoplastics, the two layers of thermoplastics both extending throughout the laminate and being sealed to each other within the regions of the holes to form a membrane of aluminum foil and thermoplastics, and one or more layers of thermoplastics applied onto the other, inner, side of the aluminum foil.

BACKGROUND ART

Packaging containers of the single use disposable type for liquid foods are often produced from a packaging material of the type mentioned above. One such commonly occurring packaging container is marketed under the trademark Tetra Brik Aseptic® and is principally employed for liquid foods such as milk, fruit juice etc. The packaging material in this known packaging container typically comprises a core layer of paper or paperboard and outer, liquid-tight layers of thermoplastics. In order to render the packaging container light- and gas-tight, in particular oxygen gas-tight, for example for the purpose of aseptic packaging and packaging of fruit juices, the material in these packaging containers is normally provided with at least one additional layer, most commonly an aluminum foil, which moreover renders the packaging material thermosealable by inductive thermosealing which is a rapid and efficient sealing technique for obtaining mechanically strong, liquid- and gas-tight sealing joints or seams during the production of the containers.

Packaging containers are generally produced by means of modern packaging machines of the type which form, fill and seal packages from a web or from prefabricated blanks of packaging material. From, for example, a web, packaging containers are produced in that the web is reformed into a tube by both of the longitudinal edges of the web being united to one another in an overlap joint. The tube is filled with the intended liquid food product and is divided into individual packages by repeated transversal seals of the tube at a distance from one another below the level of the contents in the tube. The packages are separated from the tube by incisions in the transverse seals and are given the desired geometric configuration, normally parallelepipedic, by fold formation along prepared crease lines in the packaging material.

In the prior art, packaging laminates for this kind of packages usually have an innermost, inside thermoplastic heat sealing layer, most commonly of a low density polyethylene (LDPE), which normally has adequate properties for heat sealing and for the function of moisture barrier towards the filled liquid contents of the package.

By innermost or inside layer is meant a layer which is applied on the side of the packaging laminate facing towards the inside of a packaging container formed from the laminate, and which will be in contact with the filled contents of a filled packaging container.

From the consumer's point of view, it is desirable that the packaging container be easy to handle and easy to open when it is time to empty the package of its contents, and in order to satisfy this need, the packaging container is often provided with some type of opening arrangement, with the aid of which it may readily be opened without the need to employ scissors or other implements.

A commonly occurring opening arrangement in such packaging containers includes a hole punched in the core layer of the package wall, the hole being covered on the inside and outside of the package wall, by the respective outer layers of the packaging wall which are sealed to one another in the region of the opening contour of the through-going hole, thus forming a membrane of the layers not being paperboard. One example of a prior art opening arrangement has a separate pull-tab or opening strip which is applied over the hole and which is rupturably sealed to the outer layer of the outside of the package wall along a sealing joint around the entire opening contour of the hole and at the same time permanently sealed to the outer layer in the region inside the opening contour of the hole.

In more advanced opening arrangements, an opening device, usually of moulded plastics, having a pouring spout and a screw top for resealing, is applied onto the region of and around the hole, which opening device is designed to penetrate or remove the membrane within the hole region by a pushing-down or screwing-down movement or, alternatively, to remove the membrane by a screwing- and/ or pulling-up movement of the opening device. In the latter kind of opening device, the inside of a screwable part of the opening device is adhered to the membrane of the hole, in such a way that when it is screwed upwards away from the packaging wall, the membrane is lifted along with the screwable part and torn away from the edges of the hole, leaving a practically clean-cut hole for pouring the filled contents out of the package.

In particular, the latter kind of opening arrangement may function similarly to a screw top of a bottle and is often desirable, since it avoids pushing residues of the membrane down through the hole into the package and the filled product.

A precondition for such an opening arrangement to function efficiently and expediently is that, there is adequate adhesion between the different layers of the membrane such that it does not delaminate when screwing- and/ or pulling-up forces, or forces of screwing and/or pushing-down, are applied to it during the opening operation.

It is generally difficult to obtain such adequate adhesion within the regions of the holes, because of the difference in total laminate thickness between the regions of the holes and the regions outside of the holes when laminating together the aluminum foil and thermoplastic layers of the membrane. When passing a web of the laminated layers through a press nip in a lamination station, the layers are pressed to adhere to each other by means of a pressure roller and a cooled cylinder. In the regions defined by the hole or the slit, the press nip is unable to press the aluminum foil and the polymer layers together sufficiently for achieving the requisite adherence.

Thus, the thickness variations of the core layer may cause that the aluminum foil, which is relatively thin, will not be pressed against and adhered sufficiently well to the surrounding layers of thermoplastics within the whole of the region defined by the hole, which means that air may be entrapped adjacent to the edges of the holes. This in turn means that there may be fracture formations in the aluminum foil, which may lead to the gas-tightness of the packaging container being impaired and thereby also the color, taste and nutritional values of the packaged food product. Furthermore, the integrity of the package may be impaired, which in turn may disturb the aseptic performance of the package.

The air inclusions also result in it being difficult to tear off or penetrate the membrane consisting of the aluminum foil and the polymeric films in the hole or slit, with the ability to open the packaging being restricted and/or with it not being possible to make a clean cut when penetrating, resulting in the formation of frayed edges.

These problems have hitherto been eliminated or at least been reduced to an acceptable level, by means of a press roller comprising a metal core with a circular-cylindrical jacket surface, which jacket surface is faced with an inner facing layer consisting of an elastic material, having a first hardness and a first thickness, and arranged on the outside of the inner facing layer, an outer facing layer consisting of an elastic material, having a second hardness and a second thickness, with the first hardness being greater than the second hardness and with the first thickness being greater than the second thickness. Preferably, the first hardness is at least 15% greater, more preferably 20% and most preferably 25% greater, than the second hardness, calculated in Shore A, with the outer facing layer exhibiting a hardness of 50-80 Shore A, preferably 60-75 Shore A.

Preferably, the second thickness constitutes 5-25%, more preferably 7-20% and most preferably 8-15%, of the total of the first thickness and the second thickness. Preferably, the second thickness is 1-10 mm, more preferably 1-5 mm and most preferably 1-3 mm.

Such a press roller has been described in a separate pending application WO 01/02751, also belonging to the applicant of the present application.

Due to the outer facing layer of lower hardness, a desired penetration is achieved in the hole regions in the core layer, when the core layer, the aluminum foil and the polymeric layers pass through the press nip, at the same time as the low thickness of the outer, softer facing layer results in the press nip length not being appreciably extended, meaning that a desired pressure can be maintained in the press nip while still retaining a high line load. The inner and outer facing layers may be made of the same or different elastomeric materials, such as for example rubber or polyurethane materials.

The described press roller should be used in at least one of the lamination station for the inside layers and/or the lamination station for the aluminum foil and the intermediate bonding layer. It may also be used in the lamination of the thermoplastic layer on the outside of the core paperboard layer.

For the purpose of an opening arrangement as described above, in particular the one functioning by a screw-pulling motion, an innermost heat sealing layer of LDPE usually is bonded to the aluminum foil by means of a bonding layer of an adhesive polymer, such as for example a graft modified polyolefin or a copolymer of ethylene and (meth)acrylic acid or a ionomer.

During the latest years, there has been an increasing interest for the use of innermost layers in packaging laminates comprising the kind of ethylene-alfa-olefin copolymers that are polymerized in the presence of a metallocene catalyst, i.e. metallocene polyethylenes (hereinafter denoted as m-PE), which normally are a type of linear low density polyethylenes (m-LLDPE).

Metallocene-polymerized polyethylenes generally have desirable properties like improved tear and puncture resistance, toughness, impact strength, clarity, antiblocking properties and heat sealing performance compared to that of ordinary LDPE. In the manufacturing of packaging containers it would therefore be highly desirable to be able to use m-PE in the innermost sealing layer in order to improve package integrity and sealability properties.

With package integrity is generally meant the package durability, i.e. the resistance to leakage of the packaging container. This is tested in a first step by measuring the electrical conductivity through the packaging laminate of the package in order to indicate if there is any kind of hole or crack in the inside thermoplastic layer(s). In a second step, the size and shape of the hole or crack is studied further by immersing the packaging laminate into a red ink solution, whereby the paperboard core layer will be colored in red at and around the hole or crack. The result is reported in number of containers with leakages out of 3000 tested packages. However, the test result does not automatically mean that the containers would actually be leaking out the filled contents, because the test method is more severe and shows very fine cracks and holes that would perhaps not normally cause problems in real, daily storage and use. In general, it has been seen that by using m-PE in the innermost sealing layer instead of LDPE, the package integrity is at least equally reliable even when employing thinner layers of the m-PE than the LDPE.

With sealability properties are meant the ability to heat seal appropriately within a temperature interval or interval of power supply. There, are for example three heat seals in a normal parallellepipedic packaging container of the Tetra Brik Aseptic® type, i.e. the seal transversally of the tube, the longitudinal overlapping seal along the tube and the seal of the longitudinal strip over and along the longitudinal seal on the inside of the tube. The transversal seal involves the double thickness of the packaging laminate and demands the highest power for sealing. It has generally been seen that the "window" or interval of temperatures and power supply within which adequate sealing is performed is greater for an m-PE than for normal LDPE heat sealing inside layers. For example, in a Tetra Brik Aseptic® filling machine, (such as TBA/8), which seals the packages by inductive sealing, the power supply to the inductive heating unit, is measured by scale units. The result of the test is reported as the range of scale units, within which adequate sealing is performed. Thus, for an m-PE inside material that is comparable to an equivalent LDPE inside material, the range of reported scale units for the transversal seal is much wider. This means that it will be less critical to exactly adjust the temperature settings of the sealing part of the filing machines, which are mostly operated by personnel at diaries and packaging plants, and that the sealing operation will be more reliable and less sensitive to fluctuations in the temperature of the sealing tools.

Thus, by exchanging the innermost layer of thermoplastics in the above-described packaging laminate from the traditional LDPE to a layer comprising an m-PE in the majority, heat sealability properties as well as package integrity may be improved or, alternatively, maintained at lower amounts of heat sealable polymer.

However, when employing m-PE in the innermost layer of a conventional packaging laminate, instead of the normal LDPE, a considerable deterioration In openability of the opening device appears. Suddenly the membrane breaks between the aluminum foil and the innermost layer of thermoplastics, i.e. between the aluminum foil and the layer comprising an adhesive polymer, due to the screwing and/or pulling movement of the membrane when opening the opening device, such that part of the membrane remains, covering the hole, and impedes the pouring-out of the contents of the package. This problem appears to be caused by insufficient adhesion between the aluminum foil and the adjacent layer of adhesive polymer on the inside of the aluminum foil.

The problem has been solved in a co-pending patent application, also belonging to the applicant of the present application, by a packaging laminate comprising a core layer of paper or carton with through-going holes, openings or slits, a layer of thermoplastics applied onto one outer side of the core layer, an aluminum foil applied onto the other, inner, side of the core layer, extending throughout the laminate, and bonded to the core layer by means of an intermediate layer of thermoplastics, the two layers of thermoplastics both extending throughout the laminate and being sealed to each other within the regions of the holes to form a membrane of aluminum foil and thermoplastics, and a layer of one or more thermoplastic materials applied onto the other, inner, side of the aluminum foil, wherein the layer of one or more thermoplastic materials consists of three part-layers, being a first adhesive part-layer applied onto the aluminum foil, a second intermediate part-layer of low density polyethylene (LDPE), and a third innermost part-layer comprising in the majority an ethylene—α-olefin copolymer, polymerized in the presence of a metallocene catalyst, a so called metallocene polyethylene (m-PE).

By such a packaging laminate, having an inside structure comprising three part-layers respectively comprising adhesive polymer, LDPE and m-PE in this order, an improvement in sealability and package integrity qualities is obtained as well as required openability properties, for the purpose of a packaging container having an opening arrangement, which at opening removes the membrane of laminated layers of aluminum foil and thermoplastics from the region of a hole in the core layer, made previous to lamination.

Such a packaging laminate is especially suitable for the aseptic packaging of milk and other foodstuffs.

An improvement in sealing and package integrity properties was expected from the usage of an m-PE instead of an LDPE in the innermost layer of a package in general, since these effects of m-PE qualities are known to a person skilled in the art. By improvement is to be understood also when the amount of heat sealable polymer may be reduced at maintained sealing and package integrity properties.

However, by using m-PE in the inside layer, the above defined openability was considerably deteriorated compared to when using LDPE, and it is believed that the strength of the m-PE became too high at opening, such that the weakest point at opening would be at the interface between the aluminum foil and the layer of adhesive polymer, why delamination between these layers would occur instead of the entire removal of the hole membrane.

According to a comparative example, wherein the thermoplastic structure inside of the aluminum foil consists of a first layer of an adhesive polymer and a second innermost layer of either LDPE or m-PE, the m-PE variant left clearly more residues of the membrane within the region of the hole, while the LDPE variant resulted in a good clean-cut opened hole.

Gradually, the inventors thus developed a theory that it is important to assure that the weakest point of the membrane at opening will not be at an interface between the layers of the membrane. The force needed to break loose the membrane from the packaging laminate around the edges of the hole, should not be higher than the adhesion force between the layers, especially between the adhesive layer and the aluminum foil, since this has often shown to be the weakest point during the development work in connection with the invention. In order to move the weakest point away from this interface between layers, mainly two considerations are believed to be of importance.

Firstly, the adhesion force between the aluminum foil and the layer of adhesive polymer should be above a certain level, why it, for example, also has been seen that it is necessary to employ a layer of an adhesive polymer for the contact with the aluminum foil, which measure however, not is sufficient in itself. The choice of adhesive polymer may play a role of course, in addition to other ways of increasing the adhesion.

Secondly, the force needed to tear the membrane away from the packaging laminate around the edges of the hole should be balanced against the above adhesion force, i.e. the strength of the sealing layer (LDPE/m-PE), along the plane of the layer in the packaging laminate around the edges of the hole, should be below a certain level in relation to the adhesion strength between aluminum foil and adhesive layer.

Furthermore, these two considerations for openability should be balanced to match the requirements on improved sealing and package integrity properties from the usage of m-PE in the sealing layer(s).

While investigating this theory, it was thus unexpectedly found that a co-extrusion coated combination of an innermost layer comprising m-PE with an intermediate layer of LDPE and a layer of an adhesive polymer applied towards the aluminum foil, enabled adequate openability properties as described above, at the same time as improved sealability and improved or maintained package integrity properties were obtained.

In a test series a packaging laminate having a two-layer inside structure was comparable to a packaging laminate having a three-layer inside structure.

The packaging laminates had the structure of an outer layer of about 16 g/m$^2$ of LDPE, a paperboard core layer, an intermediate bonding layer of about 23 g/m$^2$ of an LDPE, an aluminum foil, and the inside structure. The two-layer inside structure had a layer of about 6 g/m$^2$ of an adhesive ethylene-acrylic acid copolymer applied onto the aluminum foil and an innermost layer comprising m-PE in a quantity of about 20 g/m$^2$ applied next to the adhesive layer. The three-layer inside structure had a layer of about 6 g/m$^2$ of an adhesive ethylene-acrylic acid copolymer applied onto the aluminum foil, an intermediate layer of about 10 g/m$^2$ of LDPE and an innermost layer comprising m-PE in a quantity of about 10 g/m$^2$ applied next to the intermediate layer. The results showed a remarkable improvement for the three-layer variant in openability of a screw-top opening device of the kind that removes the membrane by a combined screwing-up and pulling-up motion. From the two-layer inside packaging laminate, almost all the packages opened at room temperature showed delaminations between the aluminum foil and the adhesive layer. The result was about the same at refrigerator temperature. However, from the three-layer inside packaging laminate, significantly fewer packages showed delaminations between the aluminum foil and the adhesive layer (8 out of 50 at both ambient and refrigerator temperature). The results from this early test series have since been improved further by optimizing the laminate structure and the lamination process.

However, the problem that the present invention intends to solve is that, for the long time packaging and storage of more aggressive or acidic foodstuffs, like for example fruit juices, the adhesion between the layers will be reduced during time, due to the migration of free fatty acids through the inside layers of thermoplastic material from the filled product into the interface between the aluminum foil and the adjacent layer of adhesive polymer. Even though the adhesion will be high initially when the packaging container is first made and filled, the adhesion between the aluminum foil and the adjacent layer of adhesive polymer as well as the openability of the packaging container will be considerably reduced after a longer time period such as a few months or a year. By the expression long-term storage is meant such a long time that an aseptic packaging container filled with fruit juice, normally should be able to be stored at ambient temperature, before the fruit juice has lost its nutritional value and taste. Normally this time is at least 6 months, preferably at least one year.

DISCLOSURE OF THE INVENTION

It is, therefore, an object of the present invention to overcome or alleviate the above-described problems.

One object of the invention is to provide a packaging laminate with improved sealability, having a core layer with punched holes, openings or slits, which provides good openability of a packaging container used for long-term storage of fruit juice, and is suitable for an opening device which is to be arranged to remove the membrane of laminated layers of aluminum foil and thermoplastics from the region of the punched hole in the core layer at the opening operation.

A further object of the invention is to provide a packaging laminate, having improved sealability properties, for the purpose of manufacturing an aseptic, gas-tight packaging container, suitable for the long-term storage of fruit juice, having improved or maintained package integrity, and suitable for an opening device, which is arranged to remove the membrane of laminated layers of aluminum foil and thermoplastics from the region of the punched hole in the core layer at the opening operation.

A particular object of the invention is to provide such a packaging laminate, which when used for packaging of fruit juices or the like, has improved retention of the adhesion between the aluminum foil and the adjacent layer of adhesive polymer applied on the inner side of the aluminum foil.

Another object of the invention is to provide such a packaging laminate exhibiting a barrier towards the migration of free fatty acids from the filled contents of the package into the packaging laminate and the interface between the aluminum foil and the adjacent layer of adhesive polymer.

These objects are attained according to the present invention by the packaging laminate as described herein. Preferred and advantageous embodiments of the packaging laminate according to the present invention have further been given the characterizing features as set forth herein.

These objects are thus attained according to the present invention by a packaging laminate comprising a core layer of paper or carton with through-going holes, openings or slits, a layer of thermoplastics applied onto one outer side of the core layer, an aluminum foil applied onto the other, inner, side of the core layer, extending throughout the laminate, and bonded to the core layer by means of an intermediate layer of thermoplastics, the two layers of thermoplastics both extending throughout the laminate and being sealed to each other within the regions of the holes to form a membrane of aluminum foil and thermoplastics, and one or more layers of thermoplastic materials applied onto the other, inner, side of the aluminum foil, wherein the one or more layers of thermoplastic materials include at least one adhesive part-layer applied adjacent to the aluminum foil, an intermediate part-layer comprising a material providing barrier properties towards migration of free fatty acids, and an innermost part-layer comprising in the majority a so called metallocene polyethylene (m-PE), i.e. an ethylene—α-olefin copolymer, polymerized in the presence of a metallocene catalyst.

According to one preferred embodiment, the intermediate part-layer comprises a cyclo-olefin copolymer (COC), preferably a blend of COC and a polyethylene.

According to another preferred embodiment, the intermediate part-layer comprises a blend of a polyethylene and a finely dispersed filler.

The ethylene-alpha-olefin copolymer of the innermost part-layer has been polymerized in the presence of a single-site catalyst, containing a metallocene transition compound. The ethylene-alpha-olefin copolymer (m-PE) is commonly a linear-low density polyethylene, i.e. an m-LLDPE. The m-PE useful for the invention has a density of from about 0,865 to about 0,935, preferably from about 0,890 to about 0,925, more preferably from about 0.900 to about 0.915 g/cm$^3$ and a melt (flow) index (MI) of from about 1 to about 20, preferably from about 10 to about 20 g/10 min at 190° C., 2,16 kg (ASTM 1278). The copolymerized alpha-olefin has 4-8 carbon atoms, and is selected from the group of 1-butene, 1-methyl-1-pentene, 1-hexene, 1-heptene or 1-octene, and is usually copolymerized in an amount of about 15 weight-% or lower.

Preferably, in the case of the material providing barrier properties towards migration of free fatty acids through the packaging laminate being a COC polymer, the m-PE used in the innermost part-layer is an m-LLDPE for the sake of compatibility between the intermediate part-layer and the innermost part-layer.

Preferably, and in particular in the case of the m-PE being a linear polyethylene, it is advantageous to blend the m-PE with an LDPE to obtain the required processability properties, such as properties of melt elasticity, strain hardening and shear thinning. Preferably, the innermost layer comprises a blend of an m-PE with from about 20 up to less than 50 weight-% of LDPE, most preferably with from about 30 to about 40 weight-% LDPE. In general, a blend of m-PE and LDPE should be within these ranges, because a blend comprising more than 80 weight-% of m-PE tends to become more difficult to manage in the melt extrusion process while a blend comprising less than 50 weight-% of m-PE tends to lose the advantageous properties that are connected with the use of m-PE. An optimally working blend for the purpose of the packaging laminate of the invention has an amount of from about 30 to about 40 weight-% of LDPE.

Preferably, the adhesive part-layer comprising an adhesive polymer, according to the invention, comprises a maleic-anhydride graft modified polyolefin, more preferably a maleic-anhydride graft modified linear low density polyethylene (MAH-g-LLDPE). Examples of such graft modified polyolefins are traded under the names of Bynel or Admer. Also other modified polyolefins are feasible as adhesive polymers for the invention, such as copolymers of ethylene and (meth)acrylic acid (EAA or EMAA). Examples of such polymers are traded under the name of Primacor, Escor and the like, but are less preferred. The MAH-g-type of modified linear polyethylenes appear to give the best adhesion results in the particular packaging laminate for the purpose of the invention. A possible alternative would be ionomer adhesives of the type traded under the name of Surlyn.

Preferably, the outer layer of thermoplastics and the intermediate bonding layer of thermoplastics comprise mainly a low density polyethylene (LDPE), although it may be possible to use a blend of a different or modified polyolefin with similar properties in these layers, for preparing a packaging laminate according to the invention. Preferably, the polyethylenes used in these layers are non-linear, thus excluding LLDPE and m-LLDPE.

The LDPE's used according to the invention have a density of above about 0,910 g/m$^3$, preferably of from 0,912-925 and more preferably of from about 0,915-0,920, a melt (flow) index (MI) of about 1-25 g/10 min (ASTM 1278).

The polyethylene comprised in the intermediate part-layer may be of the same or of a different kind than the polyethylene used in the outer layer on the other side of the core layer and in the intermediate bonding layer between the core layer and the aluminum foil.

In some cases, it may be preferred that the polyethylene comprised in the intermediate part-layer is a linear low density polyethylene (LLDPE) or a linear metallocene polyethylene (m-LLDPE).

The cyclo-olefin copolymer (COC) involved in the present invention, according to one preferred embodiment, may be any copolymer of a cyclo-olefin monomer and an α-olefin monomer, such as random co-polymers, graft co-polymers, ring-opening copolymers and various substituted such co-polymers. Preferably, the COC is a copolymer of a cyclo-olefin monomer and ethylene. Also cyclo-olefin-ethylene co-polymers further including a minor amount of a further α-olefin-monomer may be useful according to the invention. The cyclo-olefin monomer may be a polycyclic or monocyclic monomer. Preferably, the COC is a copolymer of a polycyclic monomer and ethylene. More preferably, the COC comprised in the packaging laminate according to the invention is a copolymer of a norbornene-type monomer and ethylene monomer. Such norbornene-ethylene copolymers may for example be random copolymers or copolymers of grafted ethylene units onto a trunc of a norbornene polymer chain. Most preferably, the norbornene-type monomer is norbornene, tetracyclododecen, vinylnorbornene or norbornadiene.

Preferably, the cyclo-olefin monomer is included in the COC copolymer at an amount of from about 3 mole-% up to about 80 mole-%.

Various cyclo-olefin copolymers useful for the invention are described in EP-A-0968816 on page 2, line 56—page 6, line 54, hereby incorporated by reference.

The intermediate part-layer according to the invention may consist of a cyclo-olefin copolymer alone or comprise a blend of COC with a polyethylene.

Preferably, the intermediate part-layer comprises a blend of LDPE or LLDPE and at least 40 weight-% of COC, whereby the COC constitutes the continuous phase of the blend. However, depending on the type of COC used, also other proportions of the blend may be used.

According to a second preferred embodiment, the material providing barrier properties towards free fatty acids is a filler finely dispersed in a polyethylene matrix. According to another preferred embodiment, such filler is dispersed in a polymer matrix of COC or a blend of COC with a polyethylene as described above.

Preferably, the filler comprised in a packaging laminate according to the invention is a nano-scale filler or mineral clay, which has the ability to form a barrier towards migrating substances within a polymer matrix. Typical such fillers are inorganic laminar compounds having an aspect ratio of about 50-5000, preferably of about 50-2000, a thickness of between about 0,9 and 100 nanometers and a width of from about 1 μm to about 5 μm. However, also other fillers with the ability to be similarly finely dispersed in a thermoplastic polymer matrix, are possible alternatives for the invention, such as for example mica, talc, calcium sulphate or calcium carbonate. Typical examples of suitable mineral clays include kaolinite, antigorite, smectite, vermiculite, mica, laponite, dickite, nacrite, halloysite, chrysolite, pyrophyllite, montmorillonite, hectorite, sodium tetrasilicic mica, sodium tateniolite, commonmica, margarite, phlogopite, xanthophyllite, bentonite, saponite, beidellite, nontronite and the like.

The filler particles are dispersed in a matrix of LDPE in an amount of preferably from about 0,1 to about 20 weight-%, more preferably from about 0,1 to about 10 weight-%.

With the expression "finely dispersed" is meant that the filler particles should have a suitable size and be distributed within the polymer matrix in such a way that the polymer-filler composition may be extruded at the high line speeds conventionally used in the manufacturing of the described packaging materials, without the risk of extrusion processability problems.

The mentioned materials COC and/or filler thus provide barrier properties towards migration of free fatty acids through the thermoplastic inside part-layers. Furthermore, the materials add a certain amount of brittleness to the intermediate part-layer, which affects the openability as described earlier in a positive direction.

The paperboard qualities intended for the packaging laminate of the invention generally have a stiffness of from about 200 mN to about 400 mN.

According to another aspect of the invention, there is provided a method of manufacturing the packaging laminate as specified herein, wherein the inner layer of thermoplastics is extrusion coated as part-layers, by applying at least one adhesive part-layer onto the aluminum foil, an intermediate part-layer comprising a material providing barrier properties towards migration of free fatty acids and an innermost part-layer comprising in the majority an m-PE. Preferred and advantageous embodiments of the method according to the invention have the characterizing features as set forth herein.

Most preferably, the part-layers of the inside structure described above, are applied onto the other, inner, side of the aluminum foil by means of co-extrusion coating of the layers in one process step. It would probably also be possible to extrude the adhesive and intermediate part-layers together, while the thin innermost part-layer is extrusion coated onto the intermediate part-layer in a separate step. However, there are some important advantages with the co-extrusion coating of all three layers simultaneously. Besides the obvious advantages of process simplicity, i.e. one extrusion coating process step instead of two, and increased stability of the extruded melt film by the respective part-layers supporting each other, there is also an important advantage in that the temperature of the extruded melts will be kept higher until the melt film reaches the substrate aluminum foil, which in turn appears to improve the adhesion between the adhesive part-layer and the foil. It is believed that the heat from the melt film of the intermediate part-layer is transferred to the adhesive part-layer, or the heat of the adhesive part-layer is better preserved during transport through the air gap due to the higher melt temperature of the intermediate part-layer. It was previously known that a polyethylene layer being extrusion coated onto an aluminum foil would gain better adhesion towards the foil, the higher the extrusion temperature is. It was, however, not known or even expected, that this effect would appear also via a layer of adhesive polymer, which itself cannot be extruded at a too high temperature because of the risk of degradation and a loss of adhesive properties instead. By co-extruding the part-layers all together, this effect of heat retention in the adhesive part-layer will be as high as possible and therefore that method is most preferable.

Preferably, the intermediate part-layer is extruded at a higher temperature than the adhesive part-layer and the innermost part-layer. By doing so, heat will be transferred from the intermediate part-layer to the first adhesive part-layer and the effect above will be increased further. By applying a thicker intermediate part-layer, even more high temperature heat will be transferred to the first adhesive part-layer. Preferably, the innermost, part-layer should be extruded at a temperature as low as possible in order to avoid that possible trace substances from polymer degradation, due to high temperature influence on the polymer melt, are released and migrating into the filled contents of the package, i.e. to avoid so called problems of "off-taste" of the filled food product.

Most preferably, the adhesive part-layer comprising an adhesive polymer, as well as the innermost part-layer comprising an m-PE in the majority, is extruded at the lower temperature of about 260-280° C., which is the temperature of the melt in the extruder. This temperature does not degrade the respective polymer melts and has proved to be an optimal temperature for still obtaining good adhesion to the surrounding layers. The intermediate part-layer comprising a material providing barrier properties towards migration of free fatty acids, is co-extruded with the adhesive part-layer and the innermost part-layer being at a higher temperature of about 285-300° C., preferably at about 300° C. At this temperature settings, an improved adhesion between the aluminum foil and the adhesive layer as well as improved openability, may be observed.

According to another preferred embodiment, the aluminum foil is subjected to a surface activation treatment by means of flame treatment before it is coated with the inner part-layers. Such treatment with gas flames against the aluminum foil surface, has proved to increase the adhesion between the aluminum foil and the adhesive part-layer even further, and thus contributes to improved openability properties of the membrane of the opening hole.

According to a further aspect of the invention, there is provided a packaging container for long-term storage of fruit juice, manufactured from the packaging laminate of the invention, having an optimized balance of openability properties against package integrity and seal quality, as specified in claims 16-18.

BRIEF DESCRIPTION OF THE ACCOMPANYING DRAWINGS

Further advantages and favourable characterizing features of the present invention will be apparent from the following detailed description, with reference to the appended figures, in which.

DETAILED DESCRIPTION OF THE INVENTION

Figure 1:
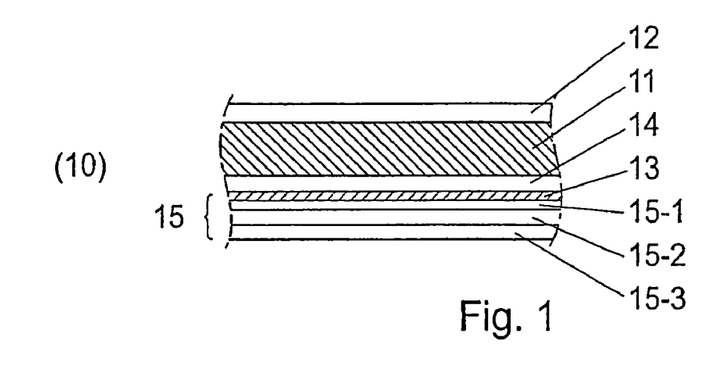
FIG. 1 is a cross-sectional view of a laminated packaging material according to the present invention.

Referring to FIG. 1, the packaging laminate of the invention 10 includes a core layer 11, which is a configurationally rigid but foldable paperboard or carton. The core layer is provided with going-through holes, opening or slits for the purpose of applying opening arrangements on the packages manufactured from the packaging laminate. On one side, being the outer side of a package produced from the laminate, i.e. the side facing outwards away from the filled food product, of the core layer 11, a layer of heat sealable thermoplastics 12 is applied, which also provides a liquid and moisture barrier to that side of the core layer. The outer thermoplastic layer is preferably applied in a quantity of about 10-17, preferably 12 g/m$^2$, and is in particular a polyethylene, such as a low density polyethylene (LDPE).

On the other, inner, side of the core layer, facing towards the inside of a package produced from the laminate, a gas barrier layer of an aluminum foil 13 is applied by means of an intermediate bonding layer of thermoplastics 14, in particular a polyethylene, such as LDPE. The intermediate bonding layer is applied in a quantity of from about 23 to about 27, preferably about 25, g/m$^2$.

On the inner side of the aluminum foil, i.e. the side not bonded to the core layer, a thermoplastic structure 15 of part-layers is applied. A first adhesive part-layer 15-1 comprising an adhesive polymer is arranged to contact the aluminum foil and provide sufficient adhesion between the aluminum foil and a second intermediate part-layer 15-2 comprising a material providing barrier properties towards migration of free fatty acids, and a third innermost part-layer 15-3, comprising in the majority an ethylene-alpha-olefin, polymerized in the presence of a single site, metallocene, catalyst (m-PE), is applied next to the intermediate part-layer.

All of the layers 12, 13, 14 and 15-1,2,3 are extending throughout the laminate and thus covering also the regions of the holes, on both sides of the core layer.

The adhesive polymer is preferably a maleic-anhydride graft modified linear low density polyethylene (MAH-g-LL-DPE). The innermost part-layer preferably consists of a blend of about 60-70 weight-% of m-LLDPE and about 30-40 weight-% of LDPE.

In an alternative embodiment according to the invention (not shown) there may be used two part layers 15-1 of different adhesive polymers for optimized adhesion to both aluminum foil and the intermediate part-layer.

Figure 2:
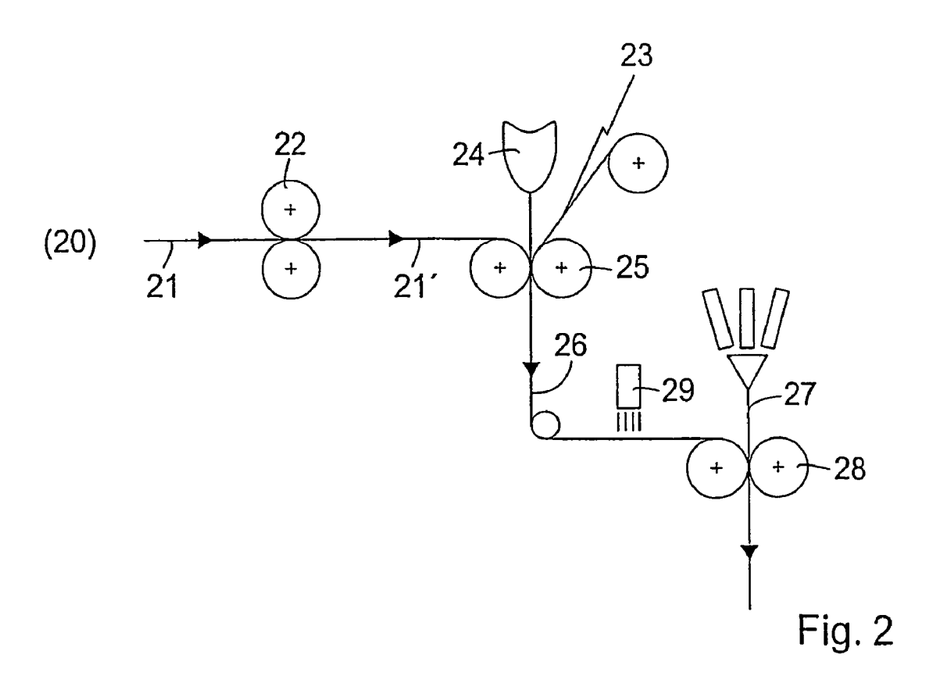
FIG. 2 schematically illustrates a method of manufacturing of the laminated packaging material described in conjunction with FIG. 1.

Referring to FIG. 2, in a method 20 of manufacturing the packaging laminate of the invention, a web of a paperboard core layer 21 is led forward through a punching station 22, where the paperboard is provided with holes for the purpose of later applied opening arrangements on the packages. The holed web 21' is further led forward to a lamination station 25 wherein a web of aluminum foil 23 is laminated to one side of the paperboard by extruding, from an extruder 24, an intermediate bonding layer comprising a material providing barrier properties towards migration of free fatty acids, between the paperboard web and the web of aluminum foil. The core layer and the aluminum foil are pressed together in a roller nip, thus, becoming a laminate of paperboard and aluminum foil 26. The laminate 26, is led forward to the next lamination station 28, where the innermost structure of thermoplastic part-layers 15 is applied by means of co-extrusion coating onto the aluminum side of the laminate 26.

The part-layers 15-1, 15-2 and 15-3, are fed from a respective extruder into a co-extrusion arrangement, preferably a feed block 27, to be formed through a die into a multi-layer melt film to be coated onto the substrate, i.e. the aluminum side of the laminate 26, pressed and cooled in a roller nip 28, thus forming the laminate coated with the heat-sealable thermoplastics on the inner side. The holed paperboard core web 21, may be coated with an outer layer of thermoplastics on its other, outer, side, by extrusion coating (not shown) before the step of lamination to aluminum foil at 25, or after the step of extrusion coating 28 of the innermost side part-layers, or between these process steps.

A double-acting pressure roller may be used at all lamination stations 25, 28 and at the lamination of the outer layer on the outside of the core layer, in combination with a rather high nip pressure, in order to achieve optimal adhesion between the laminate layers of the membranes within the regions of the holes and avoiding air entrapments between the layers close to the edges around the holes.

According to a preferred embodiment of the invention, the surface of the aluminum foil is activated by means of a flame treatment 29, before it is coated with the inside layers of thermoplastics 15, at 27.

In a comparative example, a packaging laminate with an innermost three part-layer structure, having about 7 g/m² of the adhesive polymer, about 18 g/m² of the intermediate LDPE and about 10 g/m² of the innermost part-layer comprising m-PE in the majority, was produced by extrusion coating with, and without, a preceding flame treatment of the aluminum foil inside. With preceding flame treatment, the adhesion force between the aluminum foil and the first adhesive part-layer was higher than without flame treatment. In packages manufactured from the laminate and equipped with the screwing-up/pulling-up type of opening arrangements, there were very few remarks on the openability, which moreover were merely aesthetical. Without the preceding flame treatment, there were some more residues of the membrane observed in the hole. Therefore, it has been concluded that a flame treatment of the aluminum foil is preferable when carrying out the invention.

At least in the case when the adhesive polymer of the adhesive part-layer 15-1 is an MAH-g-LLDPE, it is preferable that the adhesive layer is surface treated with an ozone treatment prior to contacting the aluminum foil, at the inside structure lamination station 28.

Figure 3:
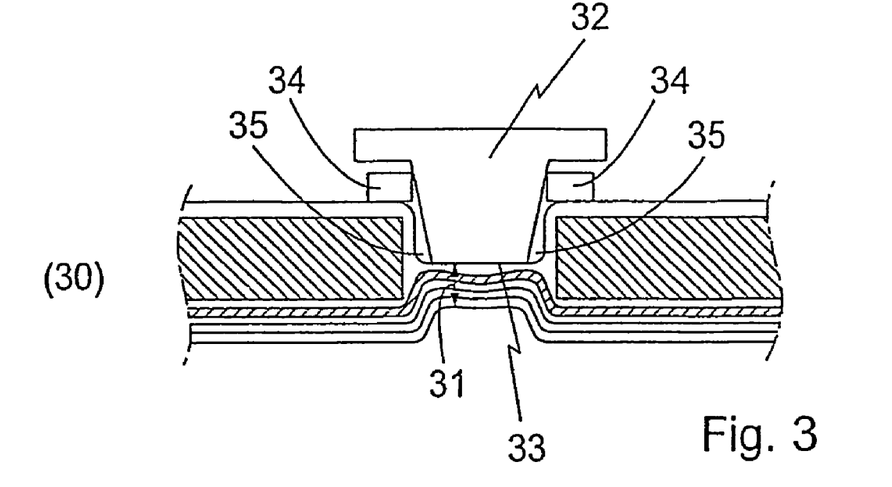
FIG. 3 schematically illustrates an opening arrangement for which the packaging laminate of the invention is particularly well suited.

Referring to FIG. 3, in an example of an intended opening arrangement 30, the laminated membrane 31, comprising layers of thermoplastics and aluminum foil, is sealed to a screw top 32, being part of an opening device applied to the packaging container, at an interface 33. When opening by screwing the screw top 32 upwards, by means of a thread arrangement with the surrounding parts of the opening device 34, the membrane is sheared along the edges around the hole 35 at the same time as it is pulled upwards together with the top.

Figure 4:
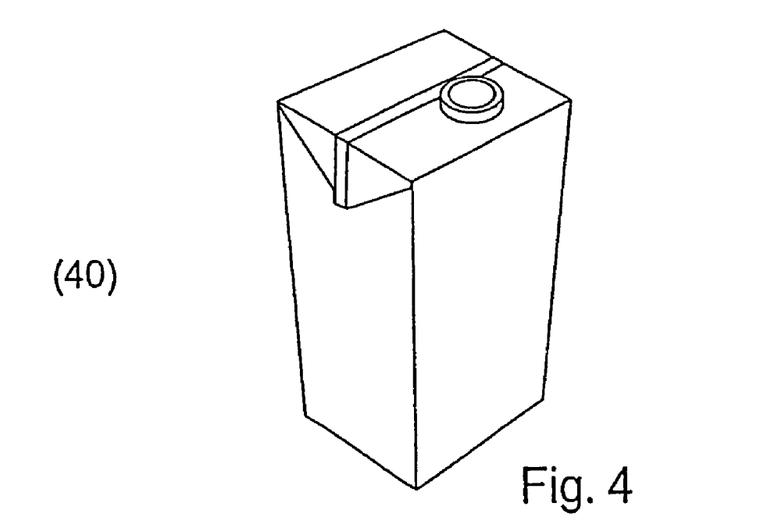
FIG. 4 is a side elevation in perspective of a configurationally stable and durable packaging container, equipped with an opening arrangement as exemplified in FIG. 3, which packaging container is produced from a laminated packaging material according to the present invention.

Referring to FIG. 4, a typical aseptic package of the type Tetra Brik Aseptic® is provided with an opening arrangement as described in FIG. 3. The hole with the membrane is provided at the top of the packaging container and there is attached an opening device of moulded plastics onto the membrane over the hole, which opening device consists of a frame and a screw top threaded into it. The opening device may be further provided with a so-called tampering evidence, the position of which indicates if the packaging container has been opened or not.

By way of conclusion it should be observed that the present invention which has been described above with particular reference to the accompanying figures, is not restricted to these embodiments described and shown exclusively by way of example, and that modifications and alterations obvious to a person skilled in the art are possible without departing from the inventive concept as disclosed in the appended claims.

The invention claimed is:

1. A packaging laminate comprising a core layer of paper or carton with at least one through-going hole, opening or slit; an outer layer of thermoplastics applied onto an outer side of the core layer; an aluminum foil applied onto an inner side of the core layer, extending throughout the laminate and extending over the entirety of the at least one through-going hole, opening or slit, and bonded to the core layer by an intermediate bonding layer of thermoplastics, the outer and intermediate bonding layers of thermoplastics both extending throughout the laminate and being in direct contact and sealed to each other within the regions of the at least one through-going hole, opening or slit to form a membrane of aluminum foil and thermoplastics, wherein each of the outer layer and the intermediate bonding layer extends over the entirety of the at least one through-going hole, opening or slit; and at least three layers of thermoplastic materials applied onto an inner side of the aluminum foil, wherein the at least three layers of thermoplastic materials include at least one adhesive layer applied adjacent to the aluminum foil, an intermediate layer comprising a material providing barrier properties towards migration of free fatty acids, and an innermost layer comprising in the majority a metallocene polyethylene, which is an ethylene —α-olefin copolymer, polymerized in the presence of a metallocene catalyst, wherein each of the at least one adhesive layer, the intermediate layer and the innermost layer extends over the entirety of the at least one through-going hole, opening or slit, and wherein each of the at least one adhesive layer, the intermediate layer and the innermost layer extends throughout the entirety of the laminate.

2. The packaging laminate according to claim 1, wherein, the intermediate layer comprises a cyclo-olefin copolymer as the barrier-providing material.

3. The packaging laminate according to claim 1, wherein, the intermediate layer comprises a blend of a cyclo-olefin copolymer and polyethylene, the cyclo-olefin copolymer constituting the continuous phase of the blend.

4. The packaging laminate according to claim 1, wherein, the intermediate layer comprises a blend of a polyethylene matrix and a finely dispersed filler.

5. The packaging laminate according to claim 1, wherein, the intermediate layer comprises a blend of a polymer matrix comprising a cyclo-olefin copolymer and a finely dispersed filler.

6. The packaging laminate according to claim 1, wherein, the innermost layer is a blend of the metallocene polyethylene with from about 20 up to below 50 weight-% of low density polyethylene.

7. The packaging laminate according to claim 1, wherein, the innermost layer is a blend of the metallocene polyethylene with from about 30 to about 40 weight-% of low density polyethylene.

8. The packaging laminate according to claim 1, wherein, the adhesive layer comprises a maleic-anhydride graft modified linear low density polyethylene.

9. The packaging laminate according to claim 1, wherein, the thermoplastics used in the outer layer and in the intermediate bonding layer is a low density polyethylene.

10. Method of manufacturing the packaging laminate as defined in claim 1, comprising the steps of providing a web of a core layer with at least one through-going hole, opening or slit, coating one outer side of the core layer with an outer layer of thermoplastics, thereby also covering the at least one through-going hole, opening or slit, and laminating the other, inner, side of the core layer to an aluminum foil by applying an intermediate bonding layer of thermoplastics, in such a way that the two layers of thermoplastics are sealed to each other within the regions of the at least one through-going hole, opening or slit thereby forming a membrane of aluminum foil and thermoplastics within the regions of the at least one through-going hole, opening or slit, wherein each of the outer layer and the intermediate bonding layer extends over the entirety of the at least one through-going hole, opening or slit, and extrusion coating the other, inner, side of the aluminum foil with at least three inner layers of thermoplastics, wherein the inner layers of thermoplastics are extrusion coated as layers, by applying at least one adhesive layer adjacent to the aluminum foil, an intermediate layer comprising a material providing barrier properties towards migration of free fatty acids and an innermost layer comprising in the majority an m-PE, wherein each of the at least one adhesive layer, the intermediate layer and the innermost layer extends over the entirety of the at least one through-going hole, opening or slit, and wherein each of the at least one adhesive layer, the intermediate layer and the innermost layer extends throughout the entirety of the laminate.

11. Method according to claim 10, wherein the intermediate layer comprises a cyclo-olefin copolymer as the barrier-providing material.

12. Method according to claim 10, wherein, the intermediate layer comprises a blend of cyclo-olefin copolymer and polyethylene, the cyclo-olefin copolymer constituting the continuous phase of the blend.

13. Method according to claim 10, wherein the intermediate layer comprises a blend of a polyethylene matrix and finely dispersed filler.

14. Method according to claim 10, wherein the adhesive, intermediate and innermost layers are applied onto the other, inner, side of the aluminum foil by means of co-extrusion coating of all the layers in one process step.

15. Method according to claim 10, wherein the aluminum foil is subjected to a surface activation treatment by means of flame treatment before it is coated with the adhesive layer.

16. A packaging container manufactured from the laminate according to claim 1.

17. The packaging container according to claim 16, wherein the packaging container comprises an opening arrangement applied onto the region of and around the membrane and the through-going hole, opening or slit.

18. The packaging container according to claim 17, wherein the opening arrangement comprises a screw top that opens the packaging container by removing the membrane from the region of the through-going hole, opening or slit by a combined screwing and pulling-up motion of the screw top.

19. The packaging laminate according to claim 9, wherein:
the thermoplastics used in the outer layer is applied in a quantity of about 10 to 17 $g/m^2$; and
the thermoplastics used in the intermediate bonding layer is applied in a quantity of about 23 to about 27 $g/m^2$.

20. The packaging laminate according to claim 1, wherein the intermediate layer consists of a cyclo-olefin copolymer.

21. The packaging laminate according to claim 1, wherein the one or more layers of thermoplastic materials consists of the at least one adhesive layer, the intermediate layer, and the innermost layer.

* * * * *